United States Patent
Zahdeh

(10) Patent No.: US 7,565,893 B2
(45) Date of Patent: Jul. 28, 2009

(54) SPARK IGNITED DIRECT INJECTION FLOW GEOMETRY FOR IMPROVED COMBUSTION

(75) Inventor: Akram R. Zahdeh, Rochester Hills, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 12/035,935

(22) Filed: Feb. 22, 2008

(65) Prior Publication Data

US 2009/0064964 A1    Mar. 12, 2009

Related U.S. Application Data

(60) Provisional application No. 60/971,119, filed on Sep. 10, 2007.

(51) Int. Cl.
*F02B 5/00* (2006.01)
*F02B 5/02* (2006.01)

(52) U.S. Cl. .......................... 123/305; 123/276

(58) Field of Classification Search ............... 123/305, 123/295, 274, 261, 276, 299
See application file for complete search history.

(56) References Cited

U.S. PATENT DOCUMENTS

| 6,715,463 B2* | 4/2004 | Kudo et al. ............... 123/261 |
| 2004/0011324 A1* | 1/2004 | Arndt et al. .............. 123/299 |

* cited by examiner

*Primary Examiner*—Mahmoud Gimie
(74) *Attorney, Agent, or Firm*—Harness, Dickey & Pierce, P.L.C.

(57) ABSTRACT

An engine assembly may include an engine block defining a cylinder bore, a piston disposed within the bore, and a spark ignited direct injection fuel system. The piston may be disposed within the bore at a position corresponding to at least 50 percent of an intake stroke of the piston. The piston and the cylinder bore may partially define a combustion chamber. The spark ignited direct injection fuel system may include a fuel injector that provides a fuel flow to the combustion chamber during the intake stroke. The fuel flow may include a plume having an angular span. The plume may have a fuel volume associated therewith and may maintain at least 30 percent of the fuel volume within the angular span. The plume may extend into the cylinder bore a distance corresponding to the piston position.

17 Claims, 3 Drawing Sheets

SPARK IGNITED DIRECT INJECTION FLOW GEOMETRY FOR IMPROVED COMBUSTION

CROSS-REFERENCE TO RELATED APPLICATIONS

This application claims the benefit of U.S. Provisional Application No. 60/971,119, filed on Sep. 10, 2007. The disclosure of the above application is incorporated herein by reference.

FIELD

The present disclosure relates to engine fuel systems, and more specifically to fuel injection flow geometry in spark ignited direct injection engines.

BACKGROUND

The statements in this section merely provide background information related to the present disclosure and may not constitute prior art.

Direct injection fuel systems may include the injection of fuel directly into an engine cylinder bore for combustion therein. The manner in which the fuel is injected into the cylinder may control the disbursement of the fuel within the cylinder bore. Ultimately, the fuel disbursement affects the combustion event.

SUMMARY

An engine assembly may include an engine block defining a cylinder bore, a piston disposed within the bore, and a spark ignited direct injection fuel system. The piston may be disposed within the bore at a position corresponding to at least 50 percent of an intake stroke of the piston. The piston and the cylinder bore may partially define a combustion chamber. The spark ignited direct injection fuel system may include a fuel injector that provides a fuel flow to the combustion chamber during the intake stroke. The fuel flow may include a plume having an angular span. The plume may have a fuel volume associated therewith and may maintain at least 30 percent of the fuel volume within the angular span. The plume may extend into the cylinder bore a distance corresponding to the piston position.

A spark ignited direct injection fuel system may include a fuel injector that provides a fuel flow to a combustion chamber defined by a cylinder bore in an engine. The fuel flow may include a plume having an angular span. The plume may have a fuel volume associated therewith and may maintain at least 30 percent of the fuel volume within the angular span. The plume may extend into the cylinder bore a distance corresponding to a location of a piston disposed within the bore at greater than 50 percent of an intake stroke of the piston.

A method may include providing a direct injection fuel injector in communication with a combustion chamber of an internal combustion engine defined by a cylinder bore in an engine block and a piston disposed for reciprocal displacement in the cylinder bore. The method may further include injecting a fuel flow from the fuel injector into the combustion chamber during an intake stroke of the piston when the piston is in a first position. The fuel flow may include a plume having an angular span. The plume may have a fuel volume associated therewith. The injecting may continue when the piston is in a second position during the intake stroke. The second position may correspond to at least 50 percent of the intake stroke. The injecting may include maintaining at least 30 percent of the fuel volume within the angular span when the plume extends into the cylinder bore a distance corresponding to the second position of the piston.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
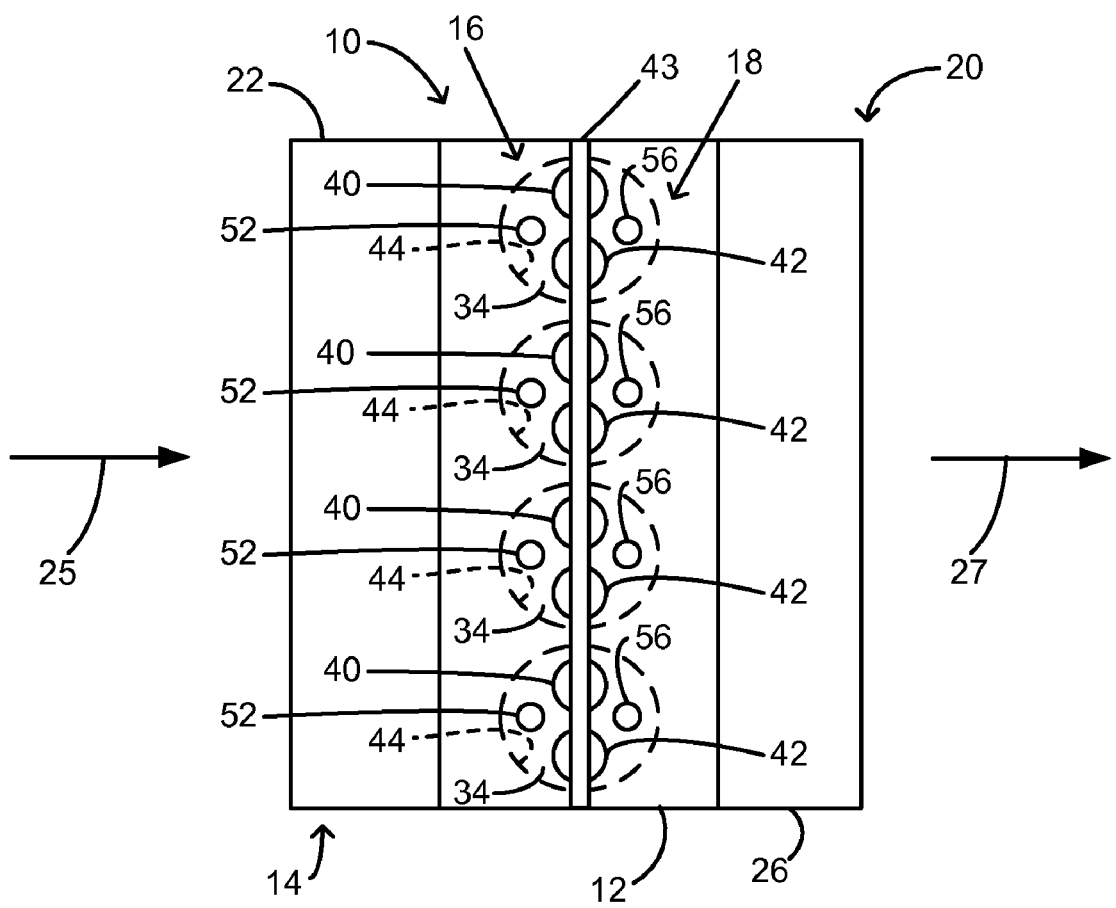
FIG. 1 is a schematic illustration of an engine assembly according to the present disclosure.

The following description is merely exemplary in nature and is not intended to limit the present disclosure, application, or uses. It should be understood that throughout the drawings, corresponding reference numerals indicate like or corresponding parts and features.

Referring now to FIG. 1, an exemplary engine assembly 10 is schematically illustrated. Engine assembly 10 may include an engine 12 in communication with an intake system 14, a fuel system 16, an ignition system 18, and an exhaust system 20. Intake system 14 may include an intake manifold 22 that provides an airflow (indicated by arrow 25) into engine 12. Fuel system 16 may control a fuel flow into engine 12 and ignition system 18 may ignite the air/fuel mixture provided to engine 12 by intake system 14 and fuel system 16. Exhaust system 20 may include an exhaust manifold 26 in communication with an exhaust gas (indicated by arrow 27) generated from ignition of the air/fuel mixture. While engine 12 is illustrated as an inline four cylinder engine, it is understood that the arrangement of engine 12 is merely exemplary and the present disclosure is applicable to a variety of engine configurations having any number of cylinders and arrangements including, but not limited to, inline and V-engines.

Figure 2:
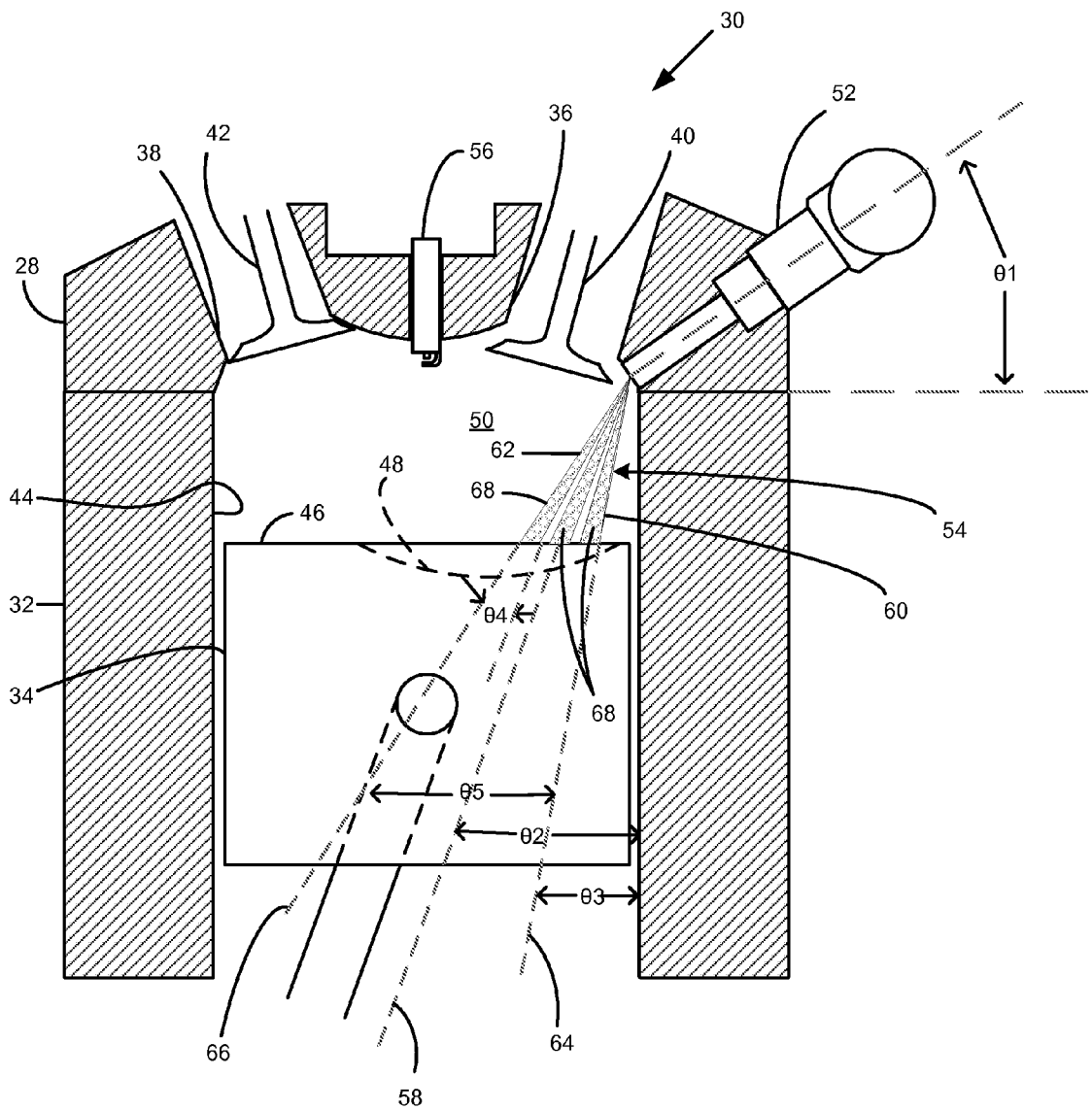
FIG. 2 is a schematic section view of the engine, fuel system, and ignition system of the engine assembly of FIG. 1.
Figure 3:
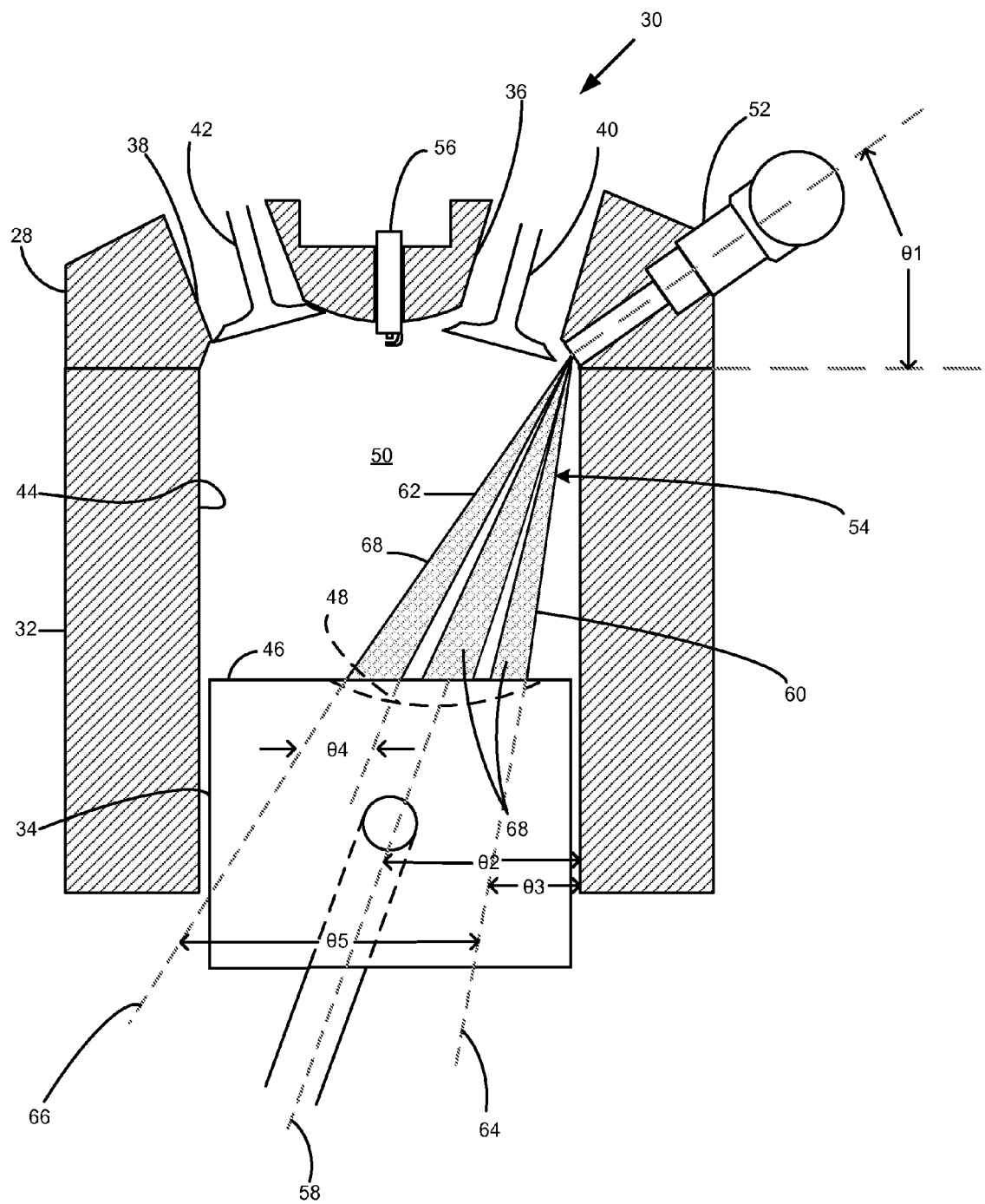
FIG. 3 is an alternate schematic section view of the engine, fuel system, and ignition system of the engine assembly of FIG. 1.

With additional reference to FIGS. 2 and 3, engine 12 may include a head 28, a valvetrain 30, a block 32, and a piston 34. Head 28 may include intake and exhaust ports 36, 38 in communication with intake and exhaust manifolds 22, 26, respectively. Valvetrain 30 may include intake and exhaust valves 40, 42. Intake valve 40 may be disposed within intake port 36 and exhaust valve 42 may be disposed within exhaust port 38. Intake and exhaust valves 40, 42 may be displaceable between open and closed positions through engagement with a camshaft 43.

Block 32 may define a cylinder bore 44 having piston 34 disposed therein. Piston 34 may include an upper surface 46 having a dish 48 defining a recess therein. Alternatively, upper surface 46 may be generally flat or may have a convex shape. Piston 34 may be disposed within cylinder bore 44 for displacement between top dead center (TDC) and bottom dead center (BDC) positions. More specifically, displacement of piston 34 may include an intake stroke, a compression stroke, a power stroke, and an exhaust stroke.

During the intake stroke, intake valve 40 may be in an open position (seen in FIGS. 2 and 3). Piston 34 may be displaceable from a first position (FIG. 2) to a second position (FIG. 3) during the intake stroke. The second position may be subsequent to the first position during the intake stroke. The first position may generally correspond to a position between TDC (start of intake stroke) and a position corresponding to 30 percent of the intake stroke. The second position may correspond to a position between 70 percent of the intake stroke and BDC (end of intake stroke).

Head 28, cylinder bore 44, and piston 34 may generally define a combustion chamber 50 for engine 12. Fuel system 16 may include a fuel injector 52 extending into and fixed to head 28. Injector 52 may be disposed at an angle $\theta 1$ relative to a plane perpendicular to cylinder bore 44. Angle $\theta 1$ may generally be between 15 and 30 degrees. For example, $\theta 1$ may be approximately 23 degrees. Injector 52 may provide a fuel flow 54 to combustion chamber 50. Ignition system 18 may include a spark plug 56 extending into combustion chamber 50 that selectively ignites the air/fuel mixture therein.

Fuel flow 54 may include a flow pattern defining a central axis 58 and an outer periphery including radially inner and outer portions 60, 62. The flow pattern of fuel flow 54 may be generally conical. Radially inner portion 60 may generally be defined at a portion of fuel flow 54 proximate a portion of cylinder bore 44 generally circumferentially aligned with injector 52. Radially outer portion 62 may be defined generally opposite radially inner portion 60.

During the intake stroke, injector 52 may begin to provide fuel flow 54 when piston 34 is in the first position (FIG. 2) and may terminate fuel injection when piston 34 is in the second position (FIG. 3). Alternatively, injector 52 may additionally continue to supply fuel beyond BDC of the intake stroke and into the compression stroke. Fuel flow 54 may be directed toward upper surface 46 when piston 34 is in the first position and when piston 34 is in the second position. More specifically, fuel flow 54 may be directed toward dish 48 when piston 34 is in the first position and when piston 34 is in the second position. Fuel flow 54 may directly impact upper surface 46 of piston 34 when piston 34 is in the first position and when piston 34 is in the second position. More specifically, fuel flow 54 may directly impact upper surface 46 during the entire intake stroke injection event.

Alternatively stated, central axis 58 may intersect upper surface 46, and more specifically dish 48, when piston 34 is in the first position and when piston 34 is in the second position. Central axis 58 may extend at an angle $\theta 2$ relative the portion of cylinder bore 44 circumferentially aligned with injector 52. Angle $\theta 2$ may generally be between 25 and 40 degrees. For example, $\theta 2$ may be approximately 33 degrees.

Additionally, axes 64, 66 extending along radially inner and outer portions 60, 62, respectively, may intersect upper surface 46, and more specifically dish 48, when piston 34 is in the first position and when piston 34 is in the second position. More specifically, axis 64 may extend at an angle of $\theta 3$ relative to the portion of cylinder bore 44 circumferentially aligned with injector 52. Angle $\theta 3$ may generally be between 5 and 25 degrees. For example, $\theta 3$ may be approximately 16 degrees. As such, during the entire intake stroke injection event, fuel flow 54 may be directed toward upper surface 46, and more specifically dish 48, and not directly toward cylinder bore 44.

Additionally, fuel flow 54 may be directed away from intake valve 40 while intake valve 40 is in the open position during the intake stroke. The outer periphery of fuel flow 54 proximate intake valve 40 may be spaced therefrom. More specifically, radially outer portion 62 may be spaced radially outwardly from intake valve 40 when intake valve 40 is in the open position. Therefore, central axis 58 may also be spaced from intake valve 40. As such, fuel flow 54 may be directed away from intake valve 40 and cylinder bore 44 and may be generally directed toward upper surface 46 of piston 34.

Fuel flow 54 may include a series of plumes 68 forming the generally conical flow pattern. Plumes 68 may each have an angular span of angle $\theta 4$ and may each include peripheries spaced apart from one another to provide an air gap therebetween. Angle $\theta 4$ may generally be less than or equal to 10 degrees, and more specifically between 5 and 10 degrees. For example, $\theta 4$ may be approximately 7 degrees. Fuel flow 54 may include an umbrella angle $\theta 5$ defining an angular span of fuel flow 54. Umbrella angle $\theta 5$ may generally be defined as the angle between radially inner and outer portions 60, 62. Umbrella angle $\theta 5$ may generally be less than or equal to 40 degrees, and more specifically between 25 and 40 degrees. For example, $\theta 5$ may be approximately 33 degrees.

The combination of angle $\theta 2$ of central axis 58 and umbrella angle $\theta 5$ may generally provide the targeting of fuel flow 54 toward upper surface 46 of piston 34. The combination of angles $\theta 2$, $\theta 5$ may also provide the spacing between fuel flow 54 and intake valve 40 during the intake stroke. The characteristics of plumes 68 may additionally contribute to the targeting and spacing discussed above.

Plumes 68 may each have a fluid velocity that is greater than the mean velocity of piston 34 during the intake stroke for a given engine speed. For example, the fluid velocity of plumes 68 may be greater than the mean velocity of piston 34 when engine 12 is operating at speeds greater than 2000 RPM, and more specifically at speeds greater than 4000 RPM.

The combination of plume angle $\theta 4$ and the fuel flow velocity associated with each plume 68 may maintain the integrity of plumes 68. Plume angle $\theta 4$ and the fuel flow velocity may inhibit diffusion of the fuel contained in each plume into the surrounding combustion chamber 50. Plumes 68 may each retain at least 50 percent of their respective injected fuel volume of fuel flow 54 up to a location within cylinder bore 44 corresponding to 50 percent of the intake stroke. More specifically, plumes 68 may retain at least 30 percent of the injected fuel volume of fuel flow 54 up to a location within cylinder bore 44 corresponding to 80 percent of the intake stroke. Retention of fuel within plumes 68 may generally include retention within plume angle $\theta 4$ for a given plume 68. Therefore, rather than having fuel flow 54 scattered within combustion chamber 50, plumes 68 may generally remain intact a distance into combustion chamber 50.

More specifically, plumes 68 may each retain at least 50 percent of the injected fuel volume of fuel flow 54 until impact occurs between upper surface 46 of piston 34 and plumes 68 when piston 34 is in a position within cylinder bore 44 corresponding to 50 percent of the intake stroke. Plumes 68 may each retain at least 30 percent of the injected fuel volume of fuel flow 54 until impact occurs between upper surface 46 of piston 34 and plumes 68 when piston 34 is in a position within cylinder bore 44 corresponding to 80 percent of the intake stroke.

Therefore, at least 50 percent of the fuel volume associated with each of plumes 68, and therefore fuel flow 54, may directly impact upper surface 46 of piston 34 when piston 34 is in a position within cylinder bore 44 corresponding to 50 percent of the intake stroke. At least 30 percent of the fuel volume associated with each of plumes 68, and therefore fuel flow 54, may directly impact upper surface 46 of piston 34 when piston 34 is in a position within cylinder bore 44 corresponding to 80 percent of the intake stroke.

Maintaining the integrity of plumes 68 may assist in targeting upper surface 46 of piston 34. Angle θ4 and the fuel flow velocity of plumes 68 may limit the amount of fuel that diffuses away from the targeted upper surface 46 of piston 34. Angle θ4 and the fuel flow velocity of plumes 68 may limit the amount of fuel that diffuses therefrom toward intake valve 40 during the intake stroke. Limiting the amount of fuel traveling toward intake valve 40 may generally limit the quantity of fuel accumulation on intake valve 40. As such, the combustion event is displaced from intake valve 40, resulting in a reduction of soot build-up on intake valve 40.

Those skilled in the art can now appreciate from the foregoing description that the broad teachings of the present disclosure can be implemented in a variety of forms. Therefore, while this disclosure has been described in connection with particular examples thereof, the true scope of the disclosure should not be so limited since other modifications will become apparent to the skilled practitioner upon a study of the drawings and the specification.

What is claimed is:

1. An engine assembly comprising:
    an engine block defining a cylinder bore;
    a piston disposed within the bore at a position corresponding to at least 50 percent of an intake stroke of the piston, the piston and the cylinder bore partially defining a combustion chamber; and
    a spark ignited direct injection fuel system including a fuel injector that provides a fuel flow to the combustion chamber during the intake stroke, the fuel flow including a plume having an angular span, the plume having a fuel volume associated therewith, a first portion of the fuel volume associated with the plume including at least 30 percent of the fuel volume and being maintained within the angular span a distance into the cylinder bore corresponding to the piston position, a second portion of the fuel volume including a remainder of the fuel volume associated with the plume and diffusing to a region outside of the angular span as the plume travels the distance into the cylinder bore, the fuel within the plume traveling at a first velocity greater than a second velocity defined by a mean velocity of the piston when the engine is operating at an engine speed of greater than 2000 revolutions per minute.

2. The engine assembly of claim 1, wherein the plume directly impacts an upper surface of the piston.

3. The engine assembly of claim 1, wherein the angular span is less than or equal to 10 degrees.

4. The engine assembly of claim 1, wherein the fuel flow is defined by a series of plumes that are spaced apart from one another, the fuel flow having an angular span of between 25 and 40 degrees.

5. The engine assembly of claim 4, wherein the fuel flow forms a generally conical flow pattern.

6. The engine assembly of claim 4, wherein the spacing between the plumes forms an air gap between adjacent plumes.

7. The engine assembly of claim 5, wherein each of the plumes has an angular span of between 5 and 10 degrees.

8. A spark ignited direct injection fuel system including a fuel injector that provides a fuel flow to a combustion chamber defined by a cylinder bore in an engine, the fuel flow including a plume having an angular span, the plume having a fuel volume associated therewith, a first portion of the fuel volume associated with the plume including at least 30 percent of the fuel volume and being maintained within the angular span a distance into the cylinder bore corresponding to a location of a piston disposed within the bore at greater than 50 percent of an intake stroke of the piston, a second portion of the fuel volume including a remainder of the fuel volume associated with the plume and diffusing to a region outside of the angular span as the plume travels the distance into the cylinder bore, the fuel within the plume traveling at a first velocity greater than a second velocity defined by a mean velocity of the piston when the engine is operating at an engine speed of greater than 2000 revolutions per minute.

9. The fuel system of claim 8, wherein the angular span is less than or equal to 10 degrees.

10. The fuel system of claim 8, wherein the fuel flow is defined by a series of plumes that are spaced apart from one another, the fuel flow having an angular span of between 25 and 40 degrees.

11. The fuel system of claim 10, wherein the fuel flow forms a generally conical flow pattern.

12. The fuel system of claim 10, wherein the spacing between the plumes forms an air gap between adjacent plumes.

13. The fuel system of claim 12, wherein each of the plumes has an angular span of between 5 and 10 degrees.

14. A method comprising:
    providing a direct injection fuel injector in communication with a combustion chamber of an internal combustion engine defined by a cylinder bore in an engine block and a piston disposed for reciprocal displacement in the cylinder bore;
    injecting a fuel flow from the fuel injector into the combustion chamber during an intake stroke of the piston when the piston is in a first position, the fuel flow including a plume having an angular span, the plume having a fuel volume associated therewith; and
    continuing the injecting when the piston is in a second position during the intake stroke corresponding to at least 50 percent of the intake stroke, the injecting including a first portion of the fuel volume associated with the plume including at least 30 percent of the fuel volume being maintained within the angular span a distance into the cylinder bore corresponding to the second position of the piston and a second portion of the fuel volume including a remainder of the fuel volume associated with the plume diffusing to a region outside of the annular span as the plume travels the distance into the cylinder bore, the fuel within the plume traveling at a first velocity greater than a second velocity defined by a mean velocity of the piston when the engine is operating at an engine speed of greater than 2000 revolutions per minute.

15. The method of claim 14, wherein the injecting includes the plume directly impacting an upper surface of the piston.

16. The method of claim 14, wherein the angular span is less than or equal to 10 degrees.

17. The method of claim 14, wherein the fuel flow is defined by a series of plumes that are spaced apart from one another, the fuel flow having an angular span of between 25 and 40 degrees.

* * * * *